(No Model.)
W. W. NELSON & C. A. SINGLETARY.
HOOK.
No. 466,700. Patented Jan. 5, 1892.
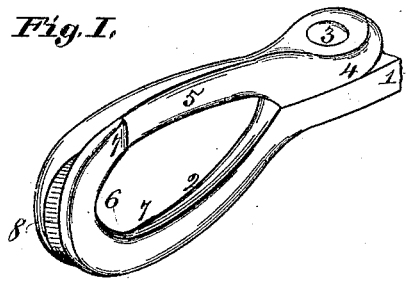
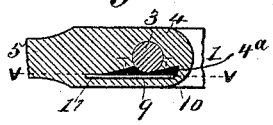
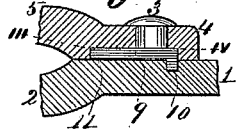
Attest:
E. Arthur
H. S. Knight
Inventors.
William W. Nelson.
Charles A. Singletary.
By Knight Bros.
Attys

UNITED STATES PATENT OFFICE.

WILLIAM W. NELSON AND CHARLES A. SINGLETARY, OF COLLINSVILLE, ILLINOIS.

HOOK.

SPECIFICATION forming part of Letters Patent No. 466,700, dated January 5, 1892.

Application filed March 8, 1889. Serial No. 302,446. (No model.)

*To all whom it may concern:*

Be it known that we, WILLIAM W. NELSON and CHARLES A. SINGLETARY, both of Collinsville, in the county of Madison and State of Illinois, have invented a certain new and useful Improvement in Snaps, of which the following is a full, clear, and exact description, reference being had to the accompanying drawings, forming part of this specification.

This snap is made to swing open laterally, and is composed of two similar hooked jaws pivoted together and having a spring at the pivot tending to close the jaws.

Figure I is a perspective view of the device, the shank being broken off, as it forms no part of our invention. Fig. II is a detail longitudinal section at III IV, Fig. IV, showing a flat or plate spring and the snap closed; and Fig. III is a section on same plane, showing the snap opened. Fig. IV is a section at V V, Fig. III.

1 is a stem of the snap. This may end in an eye for the attachment of a link or a strap, or in a screw-threaded point, or a bracket-plate for attachment to some fixed object. Such means of attachment form no part of the invention, which applies solely to the construction of the snap, and not to any special means of attachment, which we do not show, as we claim the snap for any purpose for which it may be suited. The stem 1 is made in one piece with the hook 2.

3 is a pivot which may very properly be cast upon the stem, but may, if preferred, be in the form of a screw or rivet passing through a hole in the stem and screwing into the eye-piece 4 of the hook 5, or vice versa. In the construction shown the pivot is cast upon the stem and is riveted in the eye of the hook 5. The hooks 2 and 5 are similarly formed and in reversed position, as shown, and fitted to be flat against each other at the point 6, where they overlap each other, and the ends 7 are wedge-formed, so as to give no abrupt projection on either side. Each hook is beveled off at 8, so as to give a wedge-formed recess, into which an object may be forced to spread the hooks asunder. This is important, as it forms a ready means of opening the clip. The hooks are sprung together by a spring 9 at the pivot 3, one end 10 of which spring is secured to one of the hooks and the other end 11 to the other hook.

The hooks may be made by forging, pressing, or otherwise than casting; but casting is believed to be the most available means of manufacture. If made of cast-iron it should of course be malleableized.

As shown in the drawings, a flat spring is used, the rear end being provided with a lug 10, secured in the shank, and the end 11 in the eye-piece 4 of the jaw 5. The eye-piece 4 is provided at a point near its rear end with a V-shaped opening 4ª to permit the said rear end to oscillate without interfering with the spring.

We claim as our invention—

The combination of the two hooks pivoted together and having, respectively, the shank 1 and eye-piece 4, the eye-piece 4 being provided with a socket extending past the pivot and having a V-shaped rear end 4ª, and a blade-spring arranged in said socket and having the lug 10 projecting into the shank 1, substantially as set forth.

WILLIAM W. NELSON.
CHARLES A. SINGLETARY.

In presence of—
CHARLES H. PABST,
WILLIAM B. WHITAKER.